TIME TO GO INDICATOR

Filed Feb. 12, 1963

3,162,856

TIME TO GO INDICATOR

Guy Le Parquier and Henri Poinsard, Paris, France, assignors to C.S.F.-Compagnie Générale de Telegraphie Sans Fil, a corporation of France Filed Feb. 12, 1963, Ser. No. 258,064
Claims priority, application France, Feb. 14, 1962, 887,997, Patent 1,322,261
3 Claims. (Cl. 343—112)

The present invention has for its object to provide an apparatus included in a receiver, comprising automatic gain control means for maintaining substantially constant the output level of the received signals, said apparatus allowing the measurement of the ratio $r/v$, where $r$ is the distance of a transmitting station to the receiver, and $v$ is the radial velocity of the transmitting station relatively to the receiver, it being understood that the transmission is such that the variation of the power level of the signals received by the receiver depends essentially only upon the distance $r$. The power considered is the power averaged by the filter circuits of the automatic gain control of the receiver.

According to the invention, the apparatus comprises in series: means for deriving from said automatic gain control means a first signal which is a linear function of the gain expressed in decibels; a differentiator; and means for deriving from the output signal of said differentiator a signal whose value is the reciprocal of the value of said output signal.

The invention will be best understood from the following description and appended drawing, wherein.

The invention is based on the following considerations:

As already mentioned, the signals from the transmitting station located at B are received at the receiving station located at A with a power whose variation is assumed to depend for all practical purposes only on distance $r$, the word "signal" being taken to mean any kind of signals, inclusive of jamming signals. The power P, received from a transmitter being, other things being equal, in inverse ratio to the square of the distance, one may write:

$$P=k/r^2 \tag{1}$$

where $k$ is, for the duration of the measurement, a constant depending among others on the characteristics of the transmitter station.

It follows, taking the logarithmic derivatives with respect to time $t$ of the above Relation 1, that:

$$\frac{1}{P}\cdot\frac{dP}{dt}=-\frac{2}{r}\cdot\frac{dr}{dt}=-\frac{2v}{r} \tag{2}$$

where $v$ is positive or negative according to whether distance AB increases or decreases.

The receiver A is equipped with an automatic power gain control G, which maintains the output level constant. Under these conditions, G being the gain:

$$GP=k' \text{ or } G=k'/P$$

$k'$ being a constant.

Taking the logarithmic derivatives with repsect to time of both members and substituting the value of the second member from (2), gives:

$$\frac{1}{G}\cdot\frac{dG}{dt}=-\frac{1}{P}\cdot\frac{dP}{dt}=\frac{2v}{r} \tag{3}$$

or $$\frac{d}{dt}\left(\log\frac{G}{G_0}\right)=2\frac{v}{r} \tag{4}$$

where $G_0$ is a reference gain.

The gain G of a receiver is varied, as is known, by varying the bias voltage $S_1$, which is the output signal of the automatic gain control circuit.

The relation connecting $\log G/G_0$, which value is proportional to the gain of the receiver expressed in decibels, and signal $S_1$, is known. It depends, in particular, on the structure of the receiver and generally is not linear.

It is, however, always possible to linearize this relation by means of an auxiliary, non linear system to obtain the relation:

$$\log\frac{G}{G_0}=K(S-S_0) \tag{5}$$

where K and $S_0$ are constant and S is the linearized signal.

Derivating with respect to the time the Equation 5, it follows that:

$$\frac{d}{dt}\left(\log\frac{G}{G_0}=K\frac{dS}{dt}\right. \tag{6}$$

and substituting from (4):

$$\frac{r}{v}=\frac{2}{K}\cdot\frac{dt}{dS}=K'\frac{dt}{dS} \tag{7}$$

where K' is a constant: $r/v$ is thus proportional to the reciprocal of $dS/dt$.

The system according to the invention provides signal $r/v$ starting from the automatic gain control signal.

Figure 1:
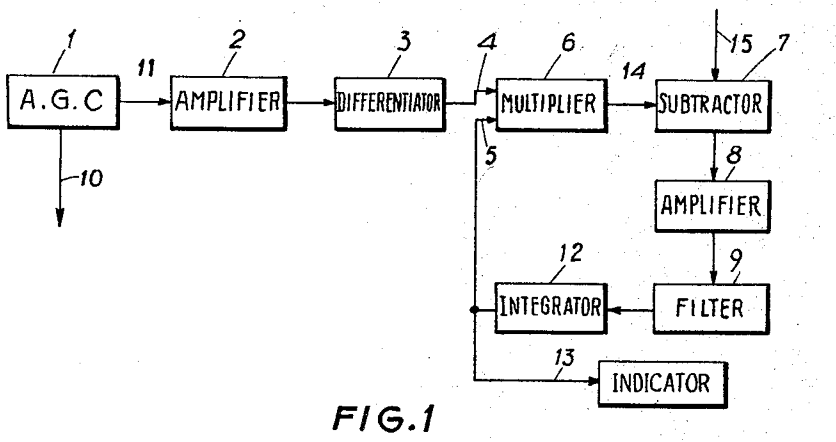
FIG. 1 is a block diagram of a system according to the invention.

The embodiment of this system shown in FIG. 1 comprises an automatic gain control circuit 1, which has two outputs 10 and 11 and provides the gain control signal $S_1$. Output 10 is connected to the receiver and output 11 feeds a non linear amplifier 2 transforming the signal $S_1$ into a signal S such that $$\log\left(\frac{G}{G_0}\right)=K(S-S_0)$$

Amplifier 2 is followed by a differentiator providing $dS/dt$.

Differentiator 3 feeds one input 4 of a multiplier 6, provided with a feedback loop and the other input 5 of which receives the output signal $u$ from this loop. The output signal $$u.\frac{dS}{dt}$$

of multiplier 6 feeds an input 14 of a subtracter 7, whose other input 15 receives a reference signal, taken as unity, to provide at its output the error signal $$e=1-u\frac{dS}{dt}$$

The loop comprises in series subtracter 7, an amplifier 8, a filtering circuit 9 and an integrator 12. The filtering circuit 9 may, for example, include an R-C circuit, which provides at its output the mean value of $e$ over a suitable time interval $\Delta t$, so as to eliminate the fluctuations of $e$ due to noise. The output signal $u$ of integrator 12, which is applied to the second input 5 of multiplier 6, is, in the state of equilibrium of the system and to within an approximation depending upon the gain of loop, equal to $dt/dS$, which value is equal to $r/v$, to within a constant and known factor, i.e., to the magnitude which it is desired to measure. The sign of this signal varies with the sign of velocity $v$.

It will be noted that for a constant value of $v$, signal $$\frac{dt}{dS}=\frac{1}{K'}$$

$r/v$ is a linear function of time, and that, in this case, the equilibrium state of the loop corresponds to a constant value of the input signal of integrator 12.

Signal $u$ is also collected at an additional output 13 of integrator 12 to be applied, for example, to an indicator 16 graduated in time.

All the elements of the system shown in FIG. 1 are per se entirely conventional.

The delay due to the filtering circuits of the automatic gain control is long enough for the control signal $S_1$, in the cases of a pulse transmitter, such as a radar system, not to undergo abrupt variations.

However, if the system is to operate with continuous signals such as, for example jamming signals, the filtering circuits of the automatic gain control will preferably have to be arranged in such a manner that the power received should be averaged over a sufficiently long period of time to take into account the fluctuations of the level of the signal as transmitted.

Generally, even in this case, the delay due to the filtering circuit will remain small enough for not affecting the operation of the system within the range of the usual radial speeds.

Figure 2:
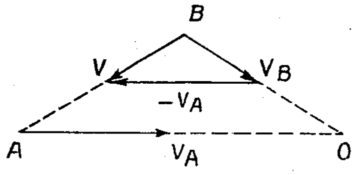
FIG. 2 is a graph showing a particular application of the invention.

FIG. 2 shows a particularly important application of the system according to the invention.

A fighter carrying a gunfire control radar system is assumed to attack a target. Should this target transmit in the direction of the fighter jamming signals, such that the echoes received by the radar can no longer be discriminated, this would make the automatic range tracking impossible.

Actually, it is obviously always possible to transmit jamming signals of such an amplitude.

Nevertheless, the direction tracking still remains possible, since the sign of the direction error signal depends only on the angular position of the target with respect to the antenna axis.

However, in order to be able to fire at the target with some chance of success, the pilot has to have some information about the distance between the fighter and the target. Such an information is made available to him by the system of the invention in terms of the time which would elapse before the fighter and the target would collide, if both retained their speeds and directions of motion.

It is assumed that, after a certain time of a proportional navigation, fighter A and target B have respective velocities, represented by vectors $V_A$ and $V_B$ of constant magnitude and direction, shown in FIG. 2, the fighter following a path which would lead to a collision with the target at a point O.

The vector $\vec{v}$ representing the radial velocity of target with respect to fighter A, which velocity, in this case, coincides with the total relative velocity vector, is then constant and the negative velocity $v$ is also constant.

Designating by T the time to elapse before the collisions would occur, $$T=\frac{AO}{V_A}=\frac{AB}{V}=-\frac{r}{v}$$

which is the magnitude obtained at the output 13, to within a constant and known factor.

In this application, the operating condition of the system as to the level variations of the power received, is satisfied, for example, if the power transmitted by the jammer is constant and if the radiation pattern of the transmitting antenna is sufficiently wide for the power transmitted towards the fighter to be substantially independent of the instantaneous orientation of the transmitting antenna relatively to fighter.

In this example, the time T is a linear function of time and the input signal of the integrator is therefore constant; the filtering circuit 9 then operates on a quantity which is basically unvarying, and, when a simple R-C filter is used; a time constant of the order of several seconds may be used.

Another application of the system of the invention is as a system aboard an aircraft A for listening to a radar carried by another aircraft B.

The sign of $r/v$ indicates if the aircraft B is nearing to or moving away from aircraft A, account being taken of the relative motion of both aircrafts.

Assuming $v$ to be constant at a first approximation, $r/v$ will indicate the time interval at the end of which a collision will occur if nothing is changed and the knowledge of this time interval allows aircraft A to effect the necessary change in its flight direction at the most favourable instant.

It is to be noted that such a case would correspond to that of a pulse transmission.

What is claimed is:

1. In a receiver comprising automatic gain control means for maintaining substantially constant the output level of the received signals, an apparatus for measuring the ratio $r/v$, where $r$ is the distance of a transmitting station to said receiver, and $v$ the radial velocity of said transmitting station relatively to said receiver, said apparatus comprising in series: means for deriving from said automatic gain control means a first signal which is a linear function of the gain expressed in decibels; a differentiator; and means for deriving from the output signal of said differentiator a signal whose value is the reciprocal of the value of said output signal.

2. In a receiver comprising automatic gain control means for maintaining substantially constant the output level of the receiver signals, said means having an output fer delivering a control signal, an apparatus for measuring the ratio $r/v$, where $r$ is the distance of a transmitting station to said receiver and $v$ the radial velocity of said transmitting station relatively to said receiver, said apparatus comprising in series: a non linear amplifier; a differentiator; and means for deriving from the output signal of said differentiator a signal whose value is the reciprocal value of said output signal.

3. A receiver comprising means for measuring the ratio $r/v$, where $r$ is the distance of a transmitting station to said receiver and $v$ the radial speed of said transmitting station relatively to said receiver, said means comprising: an automatic gain control device having an output for delivering a gain control signal; an amplifier having an input connected to said output and an output; a differentiator, having an input connected to the output of said amplifier, and an output; a multiplier having a first input connected to the output of said differentiator, a second input and an output; a subtracter having a first input, connected to the output of said multiplier, a second input, and an output; means for applying to said second input of said subtracter a unity reference signal; an amplifier having an input, connected to said subtracter output, and an output; a filter having an input, connected to said output of said amplifier, and an output; an integrator having an input, connected to said output of said filter, and an output, connected to said second input of said multiplier; and indicating means connected to said integrator output.

References Cited in the file of this patent

UNITED STATES PATENTS 2,533,889 Keizer ---------------- Dec. 12, 1950